Patented July 12, 1932

1,866,731

UNITED STATES PATENT OFFICE

KARL STAIB, OF BITTERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR PRODUCING ANHYDROUS ALUMINUM CHLORIDE

No Drawing. Application filed January 28, 1929, Serial No. 335,746, and in Germany February 7, 1928.

This invention relates to the manufacture of anhydrous aluminum chloride. It is well known that when chlorine is made to act upon raw materials such as clay, kaolin, bauxite etc. containing both alumina and silica in the presence of a reducing agent, such as carbon or carbon monoxide, the silica (besides other constituents such as iron oxide, titanium oxide etc.) is converted into chloride together with the alumina.

The production of silicon tetrachloride along with aluminum chloride in this manner is, for example, the object of the United States Patent 1,238,604. In other cases, however, when there is no possibility of utilizing the resulting silicon tetrachloride, the formation of this product, the amount of which often runs up closely to that of the aluminum chloride, only results in a corresponding loss of chlorine. When aluminum chloride is to be produced by this method on an industrial scale, for example for purposes connected with the petroleum industry, from silicious material containing alumina, its manufacture must be independent of the questionable chance of sale of the silicon tetrachloride simultaneously formed, and any considerable loss of chlorine must be avoided.

My experiments have shown that the formation of aluminum chloride does not only occur when bringing alumina into contact with chlorine in the presence of reducing materials, for instance, carbon, but may also take place when silicon chloride is admixed to the chlorine and the chlorination is carried out at temperatures above 500° C., according to the equation

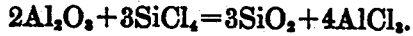
$$2Al_2O_3 + 3SiCl_4 = 3SiO_2 + 4AlCl_3.$$

I have furthermore ascertained that the silica contents of the aluminous material is practically not affected by the chlorine under these conditions.

It follows from these experiments that the chlorination process can be entirely restricted to the formation of AlCl₃ by providing, from the very beginning, for the presence of a sufficient quantity of silicon chloride in the chlorine gas.

I have found that when using a mixture of about equal parts of SiCl₄ and chlorine and carrying out the reaction at about 750° C., there is no surplus formation of SiCl₄, due to reaction with the said materials, the entire chlorine content of the gas mixture being utilized for the formation of aluminum chloride.

The effect of the presence of silicon chloride in the chlorine seems to be due to the shifting of the equilibrium of the reaction towards the exclusive formation of aluminum chloride. This is enhanced by the observation that the presence of silicon chloride in the chlorine gas, in an amount considerably exceeding 50 percent, has the effect of converting part of the silicon chloride into silica, a corresponding amount of alumina being converted to aluminum chloride. Moreover, if an insufficient quantity of silicon chloride i. e., less than about 50 percent of the total weight, be admixed to the chlorine, formation of silicon chloride from the solid material containing silica and alumina takes place simultaneously with the conversion of part of the latter into aluminum chloride. Thus, by suitably adjusting the silicon chloride content in the gas mixture used for chlorination, the formation of SiCl₄ may be allowed to take place to the desired extent, or it may be entirely avoided, the chlorine being spent quantitatively for producing aluminum chloride.

In carrying out my invention in practice I preferably proceed as follows: A mixture of chlorine with silicon tetrachloride in a ratio as required by the desired amount of SiCl₄ in the resulting products is brought into close contact with a mixture of a material containing both alumina and silica, and a substance containing carbon as a reducing material, the substances being preferably finely ground, briquetted, and coked, for instance as described in my copending application Ser. No. 200,499. The reaction takes place at about 700–800° C. The vapors issuing from the reaction chamber are then led away and separated in known manner by cooling them below the sublimation point of AlCl₃, but above the condensing point of SiCl₄, preferably to about 60° C. The silicon tetrachloride after separate condensation may then be reused in the process, or if produced in excess it may be disposed of in any other manner desired.

The charging of the chloride gas with the necessary amount of silicon tetrachloride may be effected in a very simple way in view of the fact that silicon chloride boils at 57° C. and has a high vapor tension even at ordinary temperature; therefore, by passing the chlorine gas through liquid silicon chloride the chlorine becomes saturated and the amount of silicon chloride, thus taken up by the chlorine, may be easily regulated by adjusting the temperature at which the saturation is carried out.

*Examples*

1. (Showing the old art): 100 kgs. of a mixture formed of clay and coke and lignite, coked at red heat and containing about 30 percent $Al_2O_3$, 55 percent $SiO_2$ and 15 percent C, are treated with 102 kgs. of chlorine at about 700–800° C. The resulting product consists of 71 kgs. $AlCl_3$ and 54 kgs. $SiCl_4$, the residue being left amounting to about 36 kgs. The chlorine is spent by forming both $AlCl_3$ and $SiCl_4$.

2. (Showing the new process): 100 kgs. of the same starting material as described in the foregoing example are treated with about 57 kgs. of chlorine to which about 60 kgs. of $SiCl_4$ are admixed. Vapors containing 71 kgs. $AlCl_3$ besides $SiCl_4$ are formed wherefrom after precipitating the $AlCl_3$ about 60 kgs. $SiCl_4$ are recovered by condensation, i. e. the same amount as was introduced. The residue of the raw material, thus treated, amounts to about 65 kgs. The chlorine thus has been utilized for producing $AlCl_3$ exclusively.

3. 100 kgs. of the starting material used in Example 1 are treated with 45 kgs. of chlorine at about 750° C., 75 kgs. $SiCl_4$ being admixed to the chlorine. 70 kgs. $AlCl_3$ are formed and about 61.5 kgs. $SiCl_4$ are condensed, the residue amounting to about 70.5 kgs. This shows that 13.5 kgs. $SiCl_4$ have reacted with $Al_2O_3$ to form $AlCl_3$, i. e. a little more than 20 percent of the silicon chloride has reacted with the alumina instead of chlorine, according to the equation referred to above. From this it follows that the occasional admixture to the chlorine of an excess of $SiCl_4$ does no harm, this excess being utilized in favor of the formation of aluminum chloride.

Claims:

1. The process for producing anhydrous aluminum chloride from raw materials containing both alumina and silicic acid, which process comprises heating the said raw materials admixed with carbonaceous matter acting as reducing material in the presence of chlorine, causing the material to react with chlorine charged with silicon tetrachloride vapors and separating the resulting aluminum chloride from the mixture of vapors by condensation.

2. The process for producing anhydrous aluminum chloride from raw materials containing both alumina and silicic acid, which process comprises heating the said raw materials admixed with carbonaceous matter acting as reducing material in the presence of chlorine, causing the material to react with chlorine charged with silicon tetrachloride vapors, separating the resulting aluminum chloride from the mixture of vapors by condensation, condensing the remaining silicon tetrachloride, contacting the condensate with chlorine gas and subjecting the resulting gaseous mixture to further reaction with said raw materials.

3. The process for producing anhydrous aluminum chloride from raw materials containing both alumina and silicic acid, which process comprises heating the said raw materials in the presence of carbon, causing the material to react with chlorine charged with silicon tetrachloride vapors, separating the aluminum chloride from the mixture of vapors by condensation, condensing the remaining silicon tetrachloride, contacting the condensate with chlorine gas and subjecting the resulting gaseous mixture to further reaction with said raw materials.

4. The process for producing anhydrous aluminum chloride from raw materials containing both alumina and silicic acid, which process comprises admixing carbonaceous matter with said raw materials, heating the mixture to coke the carbonaceous matter, causing the material to react with chlorine charged with silicon tetrachloride vapors, separating the resulting aluminum chloride from the mixture of vapors by condensation, condensing the remaining silicon tetrachloride, contacting the condensate with chlorine gas and subjecting the resulting gaseous mixture to further reaction with said raw materials.

5. The process for producing anhydrous aluminum chloride from raw materials containing both alumina and silicic acid, which process comprises admixing carbonaceous matter to the said raw materials, heating the mixture to coke the carbonaceous matter, causing the mixture to react with chlorine charged with about an equal part by weight of silicon tetrachloride, separating the resulting aluminum chloride from the mixture of vapors by condensation, condensing the remaining silicon tetrachloride, contacting the condensate with chlorine gas and subjecting the resulting gaseous mixture to further reaction with said raw materials.

6. The process for producing anhydrous aluminum chloride from raw materials containing both alumina and silicic acid, which process comprises admixing brown coal to the said raw materials, briquetting the mixture, heating it to about 700° to 800° C., causing the material to react with chlorine charged with about an equal part by weight of silicon tetrachloride, separating the resulting aluminum chloride from the mixture of vapors by condensation, admixing fresh chlorine with the remaining silicon tetrachloride and subjecting the resulting gaseous mixture to further reaction with said raw materials.

In testimony whereof I have hereunto set my hand.

KARL STAIB.